US012790269B2

(12) United States Patent
Minato et al.

(10) Patent No.: US 12,790,269 B2
(45) Date of Patent: Nov. 10, 2026

(54) CEMENT COMPOSITION AND CURED PRODUCT THEREOF

(71) Applicant: DOW TORAY CO., LTD., Tokyo (JP)

(72) Inventors: Taro Minato, Tokyo (JP); Katsuhiko Taniguchi, Tokyo (JP); Sakae Ushijima, Tokyo (JP); Hideyuki Mori, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 947 days.

(21) Appl. No.: 17/911,740

(22) PCT Filed: Mar. 17, 2021

(86) PCT No.: PCT/JP2021/010793
§ 371 (c)(1),
(2) Date: Oct. 7, 2022

(87) PCT Pub. No.: WO2021/187522
PCT Pub. Date: Sep. 23, 2021

(65) Prior Publication Data

US 2023/0131818 A1 Apr. 27, 2023

(30) Foreign Application Priority Data

Mar. 17, 2020 (JP) ................................ 2020-046297

(51) Int. Cl.
*C04B 24/42* (2006.01)
*C04B 20/00* (2006.01)
(Continued)

(52) U.S. Cl.
CPC .......... *C04B 24/42* (2013.01); *C04B 20/0036* (2013.01); *C04B 28/04* (2013.01);
(Continued)

(58) Field of Classification Search
CPC .... Y02W 30/91; C04B 2103/65; C04B 24/42; C04B 20/0036; C04B 24/40; C08L 83/00; C08L 83/06; Y02P 40/10
See application file for complete search history.

(56) References Cited

U.S. PATENT DOCUMENTS 4,394,335 A 7/1983 Roth et al.
4,753,679 A 6/1988 Damiano et al.
(Continued)

FOREIGN PATENT DOCUMENTS

CN 115298148 A 11/2022
EP 0939105 A1 9/1999
(Continued)

OTHER PUBLICATIONS

Machine translation of JP-2014144878-A, with paragraph numbers (Year: 2014).*
(Continued)

*Primary Examiner* — Amber R Orlando
*Assistant Examiner* — Ryan Patrick Loughran
(74) *Attorney, Agent, or Firm* — Warner Norcross + Judd LLP

(57) ABSTRACT

A cement composition is provided. The cement composition comprises: a microcapsule and cement. The microcapsule is provided with a core-shell structure having i) a core containing a water-repellent organosilicon material selected from the group consisting of organosilanes, organosilane partial condensation products, and branched siloxane resins, and ii) a shell of a silicon-based network polymer containing a silica unit. The microcapsule is included at 0.01 to less than 0.5 parts by weight per 100 parts by weight of the cement. Thus, it is possible to provide a cement composition that can provide a cured product having high strength, as
(Continued)

well as excellent air content stability, substance penetration prevention, drying shrinkage, and freeze-thaw resistance.

12 Claims, 2 Drawing Sheets

(51) Int. Cl.

| | |
|---|---|
| ***C04B 28/04*** | (2006.01) |
| ***C04B 40/00*** | (2006.01) |
| *C04B 103/65* | (2006.01) |
| *C04B 111/20* | (2006.01) |
| *C04B 111/27* | (2006.01) |

(52) U.S. Cl.

CPC ...... *C04B 40/0039* (2013.01); *C04B 2103/65* (2013.01); *C04B 2111/27* (2013.01); *C04B 2111/29* (2013.01)

(56) References Cited

U.S. PATENT DOCUMENTS

| | | | | |
|---|---|---|---|---|
| 2001/0045070 | A1* | 11/2001 | Hunt | E04D 13/0645 52/592.4 |
| 2014/0212643 | A1 | 7/2014 | Ciuperca | |
| 2015/0125612 | A1* | 5/2015 | Campeol | B01J 13/18 427/340 |
| 2023/0146623 | A1 | 5/2023 | Minato et al. | |

FOREIGN PATENT DOCUMENTS

| | | | | |
|---|---|---|---|---|
| EP | 4122902 | A1 | | 1/2023 |
| JP | S5792561 | A | | 6/1982 |
| JP | S58500061 | A | | 1/1983 |
| JP | S62292660 | A | | 12/1987 |
| JP | H01275454 | A | | 11/1989 |
| JP | H01317140 | A | | 12/1989 |
| JP | H02015511 | B2 | | 4/1990 |
| JP | H02124751 | A | | 5/1990 |
| JP | H02199048 | A | | 8/1990 |
| JP | H04317447 | A | | 11/1992 |
| JP | H06305803 | A | | 11/1994 |
| JP | H0769696 | A | | 3/1995 |
| JP | H1036157 | A | | 2/1998 |
| JP | H11349367 | A | | 12/1999 |
| JP | 2002097045 | A | | 4/2002 |
| JP | 2010047426 | A | | 3/2010 |
| JP | 2011126729 | A | | 6/2011 |
| JP | 2012041198 | A | | 3/2012 |
| JP | 2012132002 | A | | 7/2012 |
| JP | 2013193884 | A | | 9/2013 |
| JP | 2014144878 | A | * | 8/2014 |
| JP | 2014201478 | A | | 10/2014 |
| JP | 2015525246 | A | | 9/2015 |
| JP | 2015526365 | A | | 9/2015 |
| JP | 2017025181 | A | | 2/2017 |
| KR | 100421058 | B1 | | 3/2004 |
| WO | 198101703 | A1 | | 6/1981 |
| WO | 199822530 | A1 | | 5/1998 |
| WO | 2013164381 | A1 | | 11/2013 |
| WO | 2013166280 | A1 | | 11/2013 |
| WO | 2019111768 | A1 | | 6/2019 |

OTHER PUBLICATIONS

English translation of International Search Report for PCT/JP2021/010791 dated May 18, 2021, 3 pages.

English translation of International Search Report for PCT/JP2021/010793 dated May 18, 2021, 3 pages.

Machine assisted English translation of JPH02124751A obtained from https://worldwide.espacenet.com/patent on Aug. 22, 2022, 9 pages.

Machine assisted English translation of JPH02199048A obtained from https://worldwide.espacenet.com/patent on Aug. 22, 2022, 9 pages.

Machine assisted English translation of JPS5792561A obtained from https://worldwide.espacenet.com/patent on Aug. 22, 2022, 6 pages.

Machine assisted English translation of JPH02015511B2 obtained from https://www.jpo.go.jp/e/support/j_platpat/patent_search.html, 5 pages.

Machine assisted English translation of JPS62292660A obtained from https://worldwide.espacenet.com/patent on Aug. 23, 2022, 6 pages.

Machine assisted English translation of JPH01275454A obtained from https://worldwide.espacenet.com/patent on Aug. 23, 2022, 6 pages.

Machine assisted English translation of JPH01317140A obtained from https://worldwide.espacenet.com/patent on Aug. 23, 2022, 5 pages.

Machine assisted English translation of JPH1036157A obtained from https://worldwide.espacenet.com/patent on Aug. 23, 2022, 18 pages.

Machine assisted English translation of JPH0769696A obtained from https://worldwide.espacenet.com/patent on Aug. 23, 2022, 8 pages.

Machine assisted English translation of JP2002097045A obtained from https://worldwide.espacenet.com/patent on Aug. 23, 2022, 18 pages.

Machine assisted English translation of JP2011126729A obtained from https://worldwide.espacenet.com/patent on Aug. 23, 2022, 9 pages.

Machine assisted English translation of JP2012132002A obtained from https://worldwide.espacenet.com/patent on Aug. 23, 2022, 13 pages.

Machine assisted English translation of JP2017025181A obtained from https://worldwide.espacenet.com/patent on Aug. 23, 2022, 13 pages.

Machine assisted English translation of JPH04317447A obtained from https://worldwide.espacenet.com/patent on Aug. 23, 2022, 8 pages.

Machine assisted English translation of JP2013193884A obtained from https://worldwide.espacenet.com/patent on Aug. 23, 2022, 23 pages.

Machine assisted English translation of JPH06305803A obtained from https://worldwide.espacenet.com/patent on Aug. 23, 2022, 16 pages.

Machine assisted English translation of JP2010047426A obtained from https://patents.google.com/patent on Dec. 6, 2022, 5 pages.

Machine assisted English translation of JP2014144878A obtained from https://patents.google.com/patent on Dec. 6, 2022, 10 pages.

Machine assisted English translation of WO2019111768A1 obtained from https://patents.google.com/patent on Dec. 6, 2022, 7 pages.

Machine assisted English translation of JP2012041198A obtained from https://patents.google.com/patent on Dec. 6, 2022, 10 pages.

Machine assisted English translation of JP2014201478A obtained from https://patents.google.com/patent on Dec. 6, 2022, 11 pages.

Machine assisted English translation of JPH11349367A obtained from https://patents.google.com/patent on Feb. 20, 2023, 7 pages.

* cited by examiner

CEMENT COMPOSITION AND CURED PRODUCT THEREOF

CROSS-REFERENCE TO RELATED APPLICATIONS

This application is the U.S. National Stage of International Application No. PCT/JP2021/010793 filed on 17 Mar. 2021, which claims priority to and all advantages of Japanese Application No. 2020-046297 filed on 17 Mar. 2020, the content of which is incorporated herein by reference.

TECHNICAL FIELD

The present invention relates to a cement composition containing a specific chemical admixture and to a cured product thereof.

BACKGROUND ART

In recent years, there has been an increasing need to extend the service life of concrete structures made of reinforced concrete (RC) and the like. In addition, with the development of society, concrete structures are becoming larger, taller, and more diverse, requiring even higher strength and durability. On the other hand, many cases of deterioration of concrete structures and secondary concrete products made from concrete have been reported and this has become a social problem. A factor in the premature deterioration of concrete structures and secondary concrete products is cracking that occurs on the concrete surface during the early stages of the material age. Deterioration factors such as salt, carbon dioxide, and water enter the concrete through these cracks, causing serious problems such as salt damage, neutralization, alkaline aggregate reactions, frost damage, and the like. Furthermore, salt damage and neutralization corrode the steel inside reinforced concrete, reducing the durability of reinforced concrete structures and secondary concrete products. Alkali-aggregate reactions and frost damage can also increase cracking and, in some cases, cause steel rupture, resulting in the reduced load-bearing capacity of concrete structures and secondary concrete products.

The above-mentioned deterioration, such as salt damage and neutralization, do not act singly, but rather may affect each other, and such combined deterioration is emerging as a serious problem. For example, neutralization of concrete accelerates steel corrosion, and the like inside concrete structures. Salt damage has been reported to increase the rate of neutralization (carbonation). These cause cracks in the concrete structure to widen. In addition, salt spray, a factor that causes salt damage, increases the osmotic pressure of the concrete void water, which, when combined with the freezing and thawing action on the concrete surface (frost damage), causes surface delamination and encourages further salt penetration. Furthermore, snow-melting agents which are sprayed in areas of snowfall react with components in the concrete to cause volumetric expansion, thereby breaking down the concrete surface. When cycle loading (fatigue) due to running wheel load is applied to these compound effects, the progress of deterioration is further accelerated.

Various chemical admixtures and surface impregnating agents for concrete, including water repellents, have been proposed as methods to control or prevent deterioration of these concrete structures and secondary concrete products.

Patent Document 1 proposes a method of blending hydrolyzable organosilane, a water repellent (hydrophobic substance), and an amine derivative in cement compositions to achieve cement concrete with water absorption preventing performance, chloride ion penetration preventing performance, and neutralization preventing performance, but the compressive strength of the cured product is clearly reduced.

Patent Document 2 proposes a method of blending a silane compound having hydrolyzable groups, which is a water repellent, into mortar and concrete as a salt shielding agent for cement, and achieves mortar and concrete with water absorption preventing performance and chloride ion penetration preventing performance, but the compressive strength of the cured product is clearly reduced, and in particular, the air content is increased beyond the JSCE regulation of 4.5±1.5%, which may reduce the freeze-thaw resistance.

Patent Document 3 proposes a method to achieve waterproofness without causing a decrease in strength by adding silicone oil as a water repellent in the production of foamed concrete, but the concrete production is largely divided into two processes, which makes it difficult to manufacture concrete at actual construction sites and increases the price of the product even for factory production, which may be problematic from an economic viewpoint.

Patent document 4 also proposes a method to achieve waterproofing without causing strength loss by adding silicone oil as a hydrophobic substance to an aqueous slurry of calcium silicate, which is a mineral that makes cement. However, the amount of silicone oil added is relatively high for concrete admixtures, ranging from 1.0 to 5.0 weight %, which can be problematic because of the effect thereof on flowability and the amount of air entrainment, and the increase on the price of the concrete, which is a problem from an economic perspective.

In order to suppress the strength loss that occurs when hydrophobic substances are blended to obtain waterproofing properties in mortar, Patent Document 5 proposes a method of filling the air holes by adding alkylalkoxysilane and using a reactive aggregate with reactive silica to internally generate silica gel. However, reactive aggregates containing reactive silica cannot be used in Japan because they may cause a so-called alkali-aggregate reaction, a serious deterioration phenomenon that can cause the internal steel to fracture.

Patent Document 6 proposes a method of achieving waterproofing without causing loss of strength by adding internally inorganic fine particles with a diameter of 0.02 to 20 micrometers, treated on the surface with fatty acids, which are water repellents and covering pores inside the concrete by the fine particles, and this may reduce the amount of air required to achieve freeze-thaw resistance.

Patent Document 7 proposes a method to achieve cement concrete with good workability and compressive strength as well as water absorption preventing performance and chloride ion penetration preventing performance by adding organosilane as a water repellent in addition to a polymer dispersion for cement admixtures. However, two types of chemical admixtures are used, and depending on their proportions, strength may be reduced. In addition, the amount of organosilane added is about 0.5 to 2.0 weight %, and the amount of polymer added is about 5 to 20 weight %, which are relatively large amounts with regard to the amount of cement for admixtures for concrete, and this has an effect on flowability and the amount of air entrainment, and increases the price of the concrete, which is a problem from an economic perspective.

Patent Document 8 proposes a method to achieve waterproofness without causing loss of strength by adsorbing a water repellent on the surface of a filler material such as calcium carbonate and blending, but this requires time and labor to separately prepare a filler material with a water repellent adsorbed on the surface, which may be problematic from an economic perspective.

Patent Document 9 proposes a method to achieve sufficient waterproofing performance without using a large amount of expensive alkylalkoxysilane and without reducing strength by increasing the concentration of alkylalkoxysilane, a water-repellent, near the surface, and decreasing the concentration in the cement cured product. However, this non-uniformity in waterproofing performance may cause rusting and corrosion of the rebar when cracks propagate beyond the near-surface area such that harmful substances such as salt can reach the location of the rebar.

Patent Document 10 proposes a method to improve the waterproofing of a cured body by adding a water repellent primarily containing fatty acid ester compounds in an amount of 0.01 to 5.0% with regard to the weight of cement. However, the cured body does not achieve nor intend to achieve an objective of simultaneously satisfying not only waterproofing properties, but also strength, drying shrinkage control, freeze-thaw resistance, and stability of continuous air flow.

Patent Document 11 proposes a method of improving the waterproofness of a cured body by mixing an aggregate obtained by adding Portland cement, water, and sand to a waterproofing agent, waterstop agent, or deterioration inhibitor containing an agent that reacts with calcium hydroxide in the cured cement body to produce a water-insoluble substance. However, this method may not be able to determine the optimal amount of water repellent to be added.

Document 12 proposes a method of improving the waterproofness of concrete by using a self-healing cement admixture containing a water repellent and calcium sulfoaluminate or silica powder. However, this method is problematic from an economic perspective because it requires production of a separate cement admixture to provide waterproofing, which increases the price of the concrete.

Patent Document 13 proposes a method for modifying the surface condition of cured cement by using a concrete modifier containing an alkoxysilane derivative to prevent the ingress and egress of moisture, thereby reducing drying shrinkage, improving the durability of the cured cement and preventing long-term deterioration. However, the amount of additive used is relatively high for admixtures for concrete, ranging from 1.0 to 10.0 weight % of cement, and therefore it is difficult to control flowability, air entrainment, and the like. However, the compressive strength and freeze-thaw resistance, and especially the degree of reduction in drying shrinkage, which is the objective in particular, is unclear from the Examples.

Patent Document 14 proposes a method of using a cream-like aqueous emulsion of an organosilicon compound containing an alkylalkoxysilane, a polyorganosiloxane, and an emulsifier, which can be applied to the surface of a cured concrete body without dripping, and which improves the waterproofness of the cured concrete body. However, the cured body does not achieve nor intend to achieve an objective of simultaneously satisfying not only waterproofing properties, but also strength, drying shrinkage control, freeze-thaw resistance, and stability of continuous air flow.

Patent Document 15 proposes a method for improving the freeze-thaw resistance of concrete made with fly ash cement by adding an admixture containing an air entraining agent and dimethylpolysiloxane, a defoaming agent, in the concrete mixing process. However, this method is not intended for waterproofing and is limited to concrete mixed with fly ash, making it less versatile.

Patent Document 16 proposes a method of improving water absorption prevention and shrinkage reduction properties of cured concrete by mixing in a tight layer forming agent for concrete containing a fatty acid ester mixture and an alkoxysilane derivative, but simultaneously achieving compressive strength, freeze-thaw resistance, and stability of air entrainment are not an objective of this method.

Patent Document 17 proposes a method of providing a ready-mix concrete with slump and strength in accordance with JIS A 5038 by including a cement dispersant and alkyltrimethoxysilane to provide a cured body that prevents deterioration due to alkali-silica reactions. However, this method is mainly intended to suppress alkali-silica reactions and is limited in the type of cement dispersant used and the ratio of this cement dispersant to alkyltrimethoxysilane, which limits the range of applications and may cause versatility problems.

PRIOR ART DOCUMENTS

Patent Documents

Patent Document 1: Japanese Unexamined Patent Application No. H2-124751

Patent Document 2: Japanese Unexamined Patent Application No. H2-199048

Patent Document 3: Japanese Unexamined Patent Application No. S57-92561

Patent Document 4: Japanese Examined Patent Application No. H2-15511

Patent Document 5: Japanese PCT Patent Application No. S58-500061

Patent Document 6: Japanese Unexamined Patent Application No. S62-292660

Patent Document 7: Japanese Unexamined Patent Application No. H1-275454

Patent Document 8: Japanese Unexamined Patent Application No. H1-317140

Patent Document 9: Japanese Unexamined Patent Application No. H10-36157

Patent Document 10: Japanese Unexamined Patent Application No. H7-69696

Patent Document 11: Japanese Unexamined Patent Application No. 2002-97045

Patent Document 12: Japanese Unexamined Patent Application No. 2011-126729

Patent Document 13: Japanese Unexamined Patent Application No. 2012-132002

Patent Document 14: Japanese Unexamined Patent Application No. 2017-25181

Patent Document 15: Japanese Unexamined Patent Application No. H4-317447

Patent Document 16: Japanese Unexamined Patent Application No. 2013-193884

Patent Document 17: Japanese Unexamined Patent Application No. H6-305803

SUMMARY OF THE INVENTION

Problems to be Solved by the Invention

Various chemical admixtures, such as various water repellents or the like that have been proposed or put into practical use so far, only individually respond to various factors of degradation phenomena, such as short-term drying shrinkage control, or imparting water repellency to the surface of the cured body, and there is a dichotomy in that, for example, resistance to a freeze-thaw action is reduced even if the drying shrinkage control effect is improved or compressive strength decreases even though water resistance increases. Therefore, providing a cured product of a cement composition that excels in all of air content stability, substance penetration prevention, drying shrinkage, and freeze-thaw resistance using a single chemical admixture has not been proposed.

An object of the present invention is to provide a cement composition that can provide a cured product having high strength, as well as excelling in all of air content stability, substance penetration prevention, drying shrinkage, and freeze-thaw resistance. Note that the term "cement composition" herein refers to a composition that contains at least cement.

Means for Solving the Problems

An object of the present invention is achieved by a cement composition, containing:

a microcapsule provided with a core-shell structure having a core containing a water-repellent organosilicon material selected from a group consisting of organosilanes, organosilane partial condensation products, and branched siloxane resins, and a shell of a silicon-based network polymer containing a silica unit; and cement; where the microcapsule is included at 0.01 to less than 0.5 parts by weight per 100 parts by weight of the cement.

The organosilane is preferably an organosilane containing at least one silicon-bonded alkyl group having 1 to 30 carbon atoms.

The branched siloxane resin is preferably a siloxane resin containing a siloxane unit of the formula $RSiO_{3/2}$ (R represents an alkyl group).

The cement composition can further contain at least one aggregate.

The air content in the cement composition is preferably 3 to 6 volume %, as measured in a test based on JIS A 1128 (Test method for air content of fresh concrete by pressure—air chamber pressure method).

The present invention also relates to a cured product of the aforementioned cement composition.

The cured product preferably has a compressive strength ratio after 28 days of curing in standard water of 100% or higher during a compression test based on JIS A 1108 (Compressive strength test method for concrete) and JIS A 6204 (Chemical admixture for concrete).

In a permeability test based on JIS A 6909 (Finishing coating for construction (permeability test method B)) and JSCE-K571 (Test method for surface impregnated material (draft)), the water permeability control rate of the cured product at the surface is preferably 60% or higher, and the water permeability control rate at 30 mm or more to the inside from the surface is preferably 70% or higher, after curing in standard water for 28 days.

In a length change test based on JIS A 1129-3 (Method of measuring length change of mortar and concrete—Part 3) and JIS A 6 204 (Chemical admixture for concrete), the drying shrinkage rate of the cured product for 6 months after curing in standard water for 7 days is preferably $1{,}000\times10^{-6}$ or less.

In a freeze-thaw test based on JIS A 1148 (Freeze-thaw test of concrete (method A)) and JIS A 6204 (Chemical admixture for concrete), the relative dynamic modulus of elasticity (durability index) or mass loss ratio of the cured product after 300 freeze-thaw cycles after curing in standard water for 4 weeks are preferably 80% or higher and 2.0% or less, respectively.

The void spacing coefficient of the cured product calculated based on ASTM C 457 (Linear traverse method or modified point count method using a microscope) is preferably 300 μm or less.

The present invention also relates to a molded body containing the aforementioned cured product.

The present invention also relates to a civil engineering or construction structure containing the aforementioned cured product.

The present invention also relates to a method of manufacturing a cured product, including:

a preparing step of adding a microcapsule provided with a core-shell structure having a core containing a water-repellent organosilicon material selected from a group consisting of organosilanes, organosilane partial condensation products, and branched siloxane resins, and a shell of a silicon-based network polymer containing a silica unit to a composition at least containing cement to prepare an uncured cement composition; and a curing step of curing the uncured cement composition; where in the preparing step, the microcapsule is added within a range of 0.01 to less than 0.5 parts by weight per 100 parts by weight of the cement.

The present invention also relates to a method of improving the substance penetration prevention, drying shrinkage, freeze-thaw resistance, and air content stability of a cured product of the composition, including:

a step of adding a microcapsule provided with a core-shell structure having a core containing a water-repellent organosilicon material selected from a group consisting of organosilanes, organosilane partial condensation products, and branched siloxane resins, and a shell of a silicon-based network polymer containing a silica unit to a composition at least containing cement, within a range of 0.01 to less than 0.5 parts by weight per 100 parts by weight of the cement.

The present invention is also related to an admixture for a cement composition, for improving all of air content stability, substance penetration prevention, drying shrinkage, and freeze-thaw resistance of a cured product of the composition, containing:

a microcapsule provided with a core-shell structure having a core containing a water-repellent organosilicon material selected from a group consisting of organosilanes, organosilane partial condensation products, and branched siloxane resins, and a shell of a silicon-based network polymer containing a silica unit.

The microcapsule of the admixture is preferably in a suspended form in an aqueous media.

The microcapsule of the admixture can be included at a concentration of 10 to 50 weight % based on the total weight of the admixture.

Note that in this specification, “weight %” and “parts by weight” are synonymous with “mass %” and “parts by mass,” respectively.

Effects of the Invention

The cement composition of the present invention can provide a cured product having high strength. In other words, the cured product of the present invention has high strength.

The microcapsules used in the present invention, when used at a prescribed amount, can provide a cured product having high strength and excelling in all of air content stability, substance penetration prevention, drying shrinkage, and freeze-thaw resistance. Therefore, the cement composition of the present invention can provide a cured product having high strength, as well as excelling in all of air content stability, substance penetration prevention, drying shrinkage, and freeze-thaw resistance.

The cement composition of the present invention is resistant to defoaming, and for example, the amount of air in the composition is stable before and after mixing. Therefore, the cement composition of the present invention itself also has excellent air content stability. For example, in the cement composition of the present invention, the air content, as measured in a test based on JIS A 1128 (Test method for air content of fresh concrete by pressure—air chamber pressure method), can be within a range of 3 to 6 volume %. The cement composition of the present invention can also have excellent flowability and workability.

The cured product of the present invention excels in all of air content stability, substance penetration prevention, drying shrinkage, and freeze-thaw resistance.

The cured product of the present invention can maintain stable air content, for example, within a range of 3 to 6 volume %.

In addition, the cured product of the present invention can inhibit the penetration of various substances such as water, and in particular, has excellent substance penetration inhibition not only on the surface, but also in the relatively deep interior. Thus, the cured product of the present invention can exhibit excellent permeation resistance to water, for example.

Furthermore, the cured product of the present invention has a low drying shrinkage rate, which can suppress the occurrence of cracking and the like.

In addition, the cured product of the present invention has excellent freeze-thaw resistance, and thus can exhibit high resistance to brittleness due to repeated freeze-thaw cycles, for example, in winter or in cold climates.

Furthermore, when an admixture of the present invention is added at an appropriate amount in a cement composition, the air content stability, substance penetration prevention, drying shrinkage, and freeze-thaw resistance of a cured product of the composition can all be improved.

MODE FOR CARRYING OUT THE INVENTION

Figure 1:
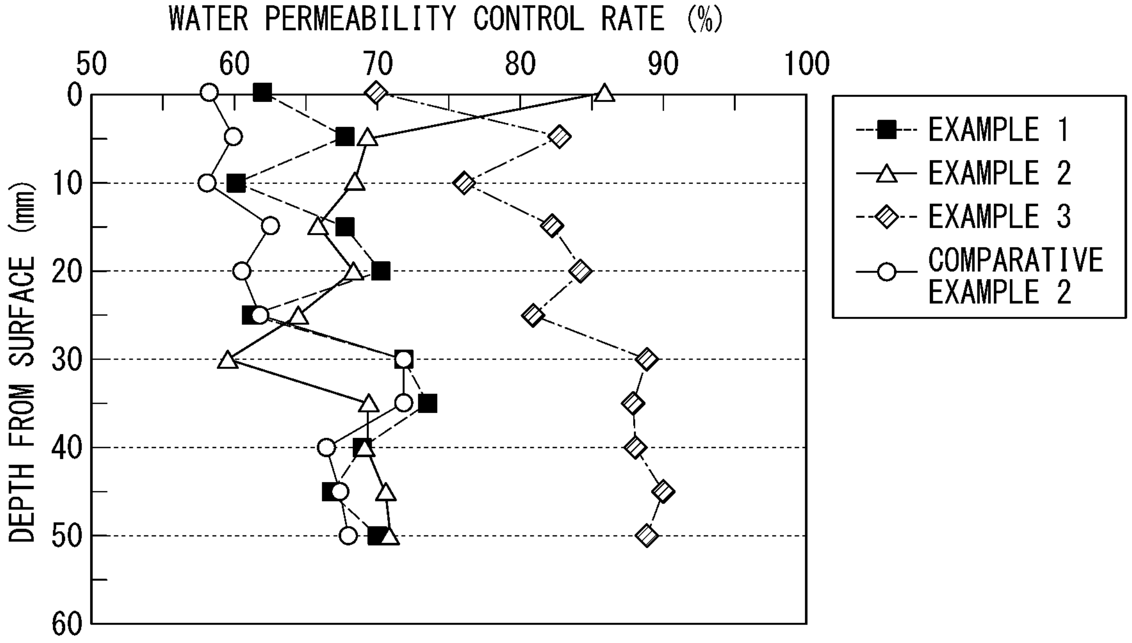
FIG. 1 shows the vertical distribution of the water permeability control rate up to 50 mm from an upper surface.

As a result of extensive research, the present inventors discovered that a cement composition containing a prescribed amount of microcapsules having a specific core-shell structure can provide a cured product having high strength and excelling in all of air content stability, substance penetration prevention, drying shrinkage, and freeze-thaw resistance, thereby achieving the present invention.

With the present invention, microcapsules with a specific core-shell structure are not applied to the surface of the cured product of the cement composition, but rather are blended in a prescribed amount into the cement composition.

Conventionally, surface impregnation methods and surface treatment methods using a water absorption inhibitor have been widely used as methods of preventing harmful substances from penetrating a cured product of concrete or other cement compositions, because the methods are easy to apply and do not damage the appearance thereof. However, the deterrent effect might not be fully demonstrated due to construction conditions, aging of the impregnated layer, and the like. Furthermore, if cracks progress deeper than the impregnated layer of the water absorption inhibitor, the cracked surface will not retain the harmful substance penetration inhibiting effect, allowing harmful substances to penetrate deep into the interior of the cured material through cracks.

However, with the present invention, microcapsules having a specific core-shell structure are blended in the cement composition in a specified amount, and therefore, the cured product of the composition can demonstrate substance penetration prevention performance, and the like, not only on the surface, but also across the entire interior.

The present invention will be further described below in detail.

[Cement Composition]

A first aspect of the present invention is an uncured, or pre-cured, cement composition. The cement composition of the present invention (hereinafter, simply referred to as “the composition of the present invention”) contains at least a microcapsule having a specific core-shell structure and cement, and the blending amount of the microcapsule is within a prescribed range.

The composition of the present invention contains cement and is a hydraulic composition with a property of curing due to the effect of water, based on a hydration reaction of cement. The microcapsules have a core-shell structure, and the water-repellent organosilicon material that forms the core is encapsulated in the capsule formed by the shell, which does not inhibit the hydration reaction of the cement.

Microcapsules

A microcapsule blended with the composition of the present invention has a core-shell structure having:

- a core containing a water-repellent organosilicon material selected from a group consisting of organosilanes, organosilane partial condensation products, and branched siloxane resins; and
- a shell of a silicon-based network polymer containing a silica unit.

The organosilane that can be used as the water-repellent organosilicon material in the present invention preferably contains at least one silicon-bondable hydrolyzable group. Therefore, the organosilane can react with components in the cement composition.

Examples of such hydrolyzable groups are alkoxy and acyloxy groups. The organosilane may be, for example, a dialkoxysilane or trialkoxysilane or mixtures thereof, or mixtures of at least one of these with organopolysiloxanes. Dialkoxysilanes are generally expressed by the formula $R_2Si(OR')_2$, and trialkoxysilanes are generally expressed by the formula $RSi(OR')_3$, wherein R represents an alkyl group, a substituted alkyl group, an aryl group, or a substituted aryl group, having 1 to 20 carbon atoms, where each R' represents an alkyl group having 1 to 4 carbon atoms, preferably 1 or 2 carbon atoms. An example of an aryl group is a phenyl group. The substituent of the substituted alkyl group or substituted aryl group may be, for example, a halogen atom such as a fluorine atom, an amino group or an epoxy group, and for the substituted aryl group, may be an alkyl group having 1 to 4 carbon atoms, preferably 1 or 2 carbon atoms, and a phenyl group may be used for the substituted alkyl group.

Preferred organosilanes contain at least one silicon-bonded alkyl group with 1 to 30 carbon atoms. Silicon-bonded means that the alkyl group is bonded directly to a silicon atom by a Si—C bond that is not hydrolyzed under normal conditions. Examples of preferred alkyl groups are those with 6 to 18 carbon atoms, such as n-octyl, 2-ethylhexyl, decyl, dodecyl, or hexyl groups. Preferred organosilanes include n-octyltrimethoxysilane, 2-ethylhexyltriethoxysilane, and n octyltriethoxysilane.

Organosilanes are partially condensed by hydrolysis of alkoxy or acyloxy hydrolyzable groups and siloxane condensation of the resulting Si—OH groups. These organosilane partial condensates may be used as the water-repellent organosilicon material. The degree of condensation of the organosilane partial condensate is preferably limited so that the organosilane still has at least one alkoxy or acyloxy hydrolyzable group per silicon atom.

The water-repellent organosilicon material used in the present invention may be a branched siloxane resin. The branched siloxane resin contains siloxane units expressed by formula $RSiO_{3/2}$ (T units) and/or siloxane units expressed by formula $SiO_{4/2}$ (Q units), optionally containing siloxane units expressed by formula $R_2SiO_{2/2}$ (D units) and/or siloxane units expressed by formula $R_3SiO_{1/2}$ (M units), where each R represents a hydrocarbyl or substituted hydrocarbyl group. The branched siloxane resin is preferably a siloxane resin containing a siloxane unit expressed by formula $RSiO_{3/2}$ (R represents an alkyl group).

Branched siloxane resins containing T siloxane units of formula $RSiO_{3/2}$, for example, may be completely or mainly a silsesquioxane resin consisting of T units. The R group in the unit expressed by formula $RSiO_{3/2}$ may be, for example, an alkyl group. Some or all of the alkyl groups in the units expressed by formula $RSiO_{3/2}$ in such resins are alkyl groups with 1 to 30 carbon atoms, and for example, alkyl groups with 6 to 18 carbon atoms such as an octyl group may be preferred. The branched siloxane resin may be, for example, an n-octylsilsesquioxane resin or n-octylmethylsilsesquioxane resin. The R group in the unit expressed by formula $RSiO_{3/2}$ may be an aryl group, such as a phenyl group. Branched siloxane resins containing both alkyl and aryl groups can also be used. The branched siloxane resin may be, for example, a phenyl silsesquioxane resin or phenyl methyl silsesquioxane resin.

The branched siloxane resin contains T-siloxane units expressed by formula $RSiO_{3/2}$, as well as D siloxane units expressed by formula $R_2SiO_{2/2}$ and/or Q siloxane units expressed by formula $SiO_{4/2}$. The branched siloxane resin may be, for example, a DT, TQ, or DTQ resin. The branched siloxane resin may be an MQ resin containing M siloxane units expressed by formula $R_3SiO_{1/2}$ and Q siloxane units expressed by formula $SiO_{4/2}$. These MQ resins preferably contain an alkyl group with 1 to 30 carbon atoms, such as an octyl group, as R.

The water-repellent organosilicon material defined above, such as water repellent organosilane, may be mixed with organopolysiloxanes having reactive groups, such as organopolysiloxanes having Si—H groups. The optional organopolysiloxane is preferably present at a weight less than the weight of the water-repellent organosilicon material defined above.

The water-repellent organosilicon material defined above, such as water repellent branched siloxane resin, which is solid at room temperature, has a viscosity of 0.5 to 10,000 mPa·s, and may be solubilized in solvents such as alkylalkoxysilane, polydimethylsiloxane, and hydrocarbons. The solvent/branched siloxane resin weight ratio may range from 10:1 to 1:10.

The microcapsules incorporated in the composition of the present invention can be produced by forming a shell of a network polymer (silicon-based network polymer) containing silica units ($SiO_{4/2}$ units) around a core of water-repellent organosilicon material selected from organosilanes, organosilane partial condensates, and branched siloxane resins.

For example, microcapsules in the composition of the present invention can be produced by adding a tetraalkoxysilane to an aqueous emulsion of a water-repellent organosilicon material selected from organosilanes, organosilane partial condensates and branched siloxane resins, and then causing the tetraalkoxysilane to condense and polymerize at the interface of a dispersed phase (preferably in the form of droplets) containing the water-repellent organosilicon material in the emulsion.

In the above production example, the tetraalkoxysilane is added to an aqueous emulsion of water-repellent organosilicon material. The water-repellent organosilicon material is emulsified in an aqueous medium, preferably with the assistance of a surfactant. The particle size of the emulsion of the water-repellent organosilicon material generally ranges from 0.01 to 500 μm, preferably 0.1 to 50 μm. Alternatively, the emulsion can be a microemulsion with a particle size of 10 to 150 nm. The surfactant can be a cationic, nonionic or amphoteric surfactant. Cationic and/or amphoteric surfactants that readily form emulsions with a positive zeta potential may be preferred. As described in European Patent No. 1471995, the present inventors have found that a positive zeta potential promotes condensation and polymerization of tetraalkoxysilane at the interface of the emulsified droplets of the water repellent organosilane.

Nonionic surfactants can be used alone or in combination with cationic or amphoteric surfactants, and for example, cationic or amphoteric surfactants can be added up to the weight of the nonionic surfactant.

In another preferred embodiment, this method is performed on-site. The water-repellent organosilicon material is mixed with tetraalkoxysilane and then, for example, mixed with a cationic surfactant to form an emulsion.

Examples of cationic surfactants include quaternary ammonium hydroxides such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, trimethylammonium tallow hydroxide, cocotrimethylammonium hydroxide, and corresponding salts thereof. Chloride salts such as hexadecyltrimethylammonium chloride may be preferred. Further examples of suitable cationic surfactants include aliphatic amines and fatty acid amides and their derivatives, basic pyridinium compounds, quaternary ammonium bases of benzimidazoline, and polypropanol polyethanolamine.

Cationic surfactants containing organosilicon groups can be used. An example of such a surfactant is N-octadecyl-N, N-dimethyl-trimethoxysilylpropylammonium chloride.

[Formula 1]

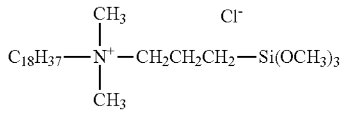

However, such cationic alkoxysilanes can be more beneficial when added as a sedimentation aid after emulsion formation, as described below.

Examples of suitable amphoteric surfactants include cocamidopropyl betaine, cocamidopropyl hydroxysulfate, cocobetaine, sodium cocoamidoacetate, cocodimethylbetaine, N-coco-3-aminobutyric acid, and imidazolinium carboxyl compounds.

The surfactants listed above may be used alone or in combination.

Examples of nonionic surfactants include polyoxyalkylene alkyl ethers, such as polyethylene glycol long-chain (12-14C) alkyl ethers, polyethylene glycol polyoxyalkylene sorbitan ethers, polyoxyalkylene alkoxylate esters, polyoxyalkylene alkyl phenol ethers, ethylene glycol propylene glycol copolymers, polyvinyl alcohols and alkyl polysaccharides, and an example is a material having the structural formula $R^1—O—(R^2O)_m-(G)_n$ (where $R^1$ represents a linear or branched-chain alkyl group, a linear or branched-chain alkenyl group, or an alkylphenyl group, $R^2$ represents an alkylene group, G represents a reducing sugar, m refers to 0 or a positive integer, and n is a positive integer) as described in U.S. Pat. No. 5,035,832.

The concentration of surfactant in the aqueous emulsion of water-repellent organosilicon material can be from 0.01 to 5 weight % of the emulsion, is preferably less than 2 weight %, is most preferably from 0.02 to 1 weight %, especially from 0.05 to 0.5 weight %.

The weight ratio of the oil (water-repellent organosilicon material) phase to the aqueous phase in the emulsion can be generally 40:1 to 1:50, but a high ratio of the aqueous phase is economically disadvantageous, especially when forming microcapsule emulsions. Typically, the weight ratio of the oil phase to the aqueous phase is 2:1 to 1:3.

The continuous phase of the emulsion may be a mixture of water and a water-miscible organic solvent such as an alcohol or lactam, provided that the continuous phase is not miscible with the water-repellent organosilicon material. The particle size (diameter) of the water-repellent organosilicon material in the emulsion can be reduced by a shearing device such as a homogenizer or microfluidizer, or the size may be reduced in a sonolator (ultrasonic mixer) that produces emulsions of microcapsules with a particle size of 200 nm to 10 μm, most preferably 2 μm to 5 μm.

The alkoxy group in the tetraalkoxysilane used in the aforementioned manner preferably contains 1 to 4 carbon atoms, most preferably 1 or 2 carbon atoms. The tetraalkoxysilane may be, for example, tetraethoxysilane (tetraethyl orthosilicate or TEOS). Tetraalkoxysilanes such as TEOS may be used alone or as partially condensed products.

In the above production example, when tetraalkoxysilane is added to an aqueous emulsion of a water-repellent organosilicon material selected from organosilanes, organosilane partial condensates, and branched siloxane resins, the tetraalkoxysilane is condensed and polymerized at the interface of the dispersed phase of the water-repellent organosilicon material in the emulsion (preferably in the form of droplets).

In other words, the tetraalkoxysilane spontaneously hydrolyzes and condenses to form a silicon-based network polymer, or a three-dimensional network of silicon-based materials, around particles of water-repellent organosilicon material. Preferably, this three-dimensional network substantially contains $SiO_{4/2}$ units.

The particle size of the microcapsules produced generally corresponds to the particle size of the starting emulsion, for example, 0.01 to 500 mm, most preferably from 200 nm to 10 mm. If microcapsules with a particle size of 10 to 500 mm, especially up to 50 or 100 mm are required, the aqueous phase of the emulsion preferably contains a thickening agent, such as polyvinylpyrrolidone, polyvinyl alcohol, bentonite clay, or cellulose derivatives, especially cellulose ethers, for example sodium carboxymethylcellulose, lightly cross-linked acrylic polymers, chemical starch, alginate, or xanthan gum, in order to prevent the microcapsules from settling out of the emulsion during or after formation. The thickener is added to the emulsion before the tetraalkoxysilane is added.

As one alternative method to the above, at least one of tri-, di-, or mono-alkoxysilanes may be used in combination with the tetraalkoxysilane to bring organic functionality to the shell. At least one of tri-, di-, or mono-alkoxysilane can be reacted with the tetraalkoxysilane to incorporate organic functional units derived from the tri-, di-, or mono-alkoxysilane into the network polymer that forms the shell of the microcapsule.

In another alternative to the above, a cationic alkoxysilane may be used in combination with the tetraalkoxysilane. N-octadecyl-N—N-dimethyl-trimethoxysilylpropyl ammonium chloride is an example of such a cationic alkoxysilane. Cationic alkoxysilanes can improve the behavior of microcapsules in the composition. The cationic alkoxysilane can be added to the aqueous emulsion before or simultaneously with the tetraalkoxysilane. The cationic alkoxysilane can react with the tetraalkoxysilane to incorporate siloxane units derived from the cationic alkoxysilane into the network polymer to form the shell of the microcapsule.

The tetraalkoxysilane may be added to the emulsion of the water-repellent organosilicon material either as a stock solution or as a solution in an organic solvent. The tetraalkoxysilane and emulsion are generally mixed under shear during addition and subsequent condensation to form a silicon polymer shell on the surface of the emulsion droplet. Mixing can be done, for example, by stirring, but the emulsion and tetraalkoxysilane can be mixed either during or after the addition of the tetraalkoxysilane until microcapsule formation is complete, and for example, applying high shear in a rotor and stator type mixer such as a Silverson (trademark) mixer, or the like is preferable. High shear mixing immediately after the addition of the tetraalkoxysilane is preferred. This results in microcapsules with reduced particle size and appears to promote polymerization of almost all of the tetraalkoxysilane at the interface of the emulsion droplets.

The condensation reaction of tetraalkoxysilane can be performed under acidic, neutral or basic pH. The condensation reaction is generally carried out at room temperature and atmospheric pressure, but may be carried out, for example, by increasing the temperature to 95° C. and increasing or decreasing the pressure under vacuum, for example, to volatilize the volatile alcohols produced during the condensation reaction. The weight ratio of water-repellent organosilicon material to tetraalkoxysilane is preferably at least 1:1 and often at least 2:1, and is for example 3:1 to 50:1. Smaller microcapsules, for example those formed from microemulsions, generally have a lower ratio of organosilane to water-reactive silicon compound.

Catalysts for hydrolysis and/or condensation of the tetraalkoxysilane may be used to form the silicon-based network polymer. The catalyst is preferably an oil-soluble organometallic compound, such as an organic tin compound, especially an organotin compound such as a diorganotin diester, for example dimethyltin di(neodecanoate), dibutyltin dilaurate or dibutyltin diacetate, or a tin carboxylate such as stannous octoate, or an organic titanium compound such as tetrabutyl titanate. The organotin catalyst may be used, for example, at 0.05 to 2 weight % of tetraalkoxysilane. Organotin catalysts have the advantage of being effective catalysis at neutral pH. The catalyst is most preferably mixed with the water-repellent organosilicon material prior to emulsification, since this promotes condensation of the tetraalkoxysilane on the surface of the emulsified lipophilic droplets. The catalyst can be added to the emulsion before, simultaneously with, or after the addition of the tetraalkoxysilane, in order to cure the silicon polymer shell formed and make it more impermeable. However, encapsulation can be achieved without a catalyst. The catalyst (if used) may be added undiluted, as a solution in an organic solvent such as a hydrocarbon, alcohol or ketone, or as a multiphase system such as an emulsion or suspension.

The product of hydrolysis and condensation of tetraalkoxysilane is an aqueous suspension of microcapsules. The aqueous continuous phase of the aqueous suspension can contain water-miscible organic solvents, such as alcohols such as ethanol, which usually result from the hydrolysis of Si-bonded alkoxy groups. Use of the microcapsule suspension as is without separating the microcapsules from the suspension may be advantageous.

In other cases, it may be advantageous to handle the microcapsules isolated from the aqueous media. The recovery or isolation of microcapsules from these suspensions can be achieved by any known liquid removal technique, such as spray drying, spray cooling, filtration, oven drying or freeze drying.

The microcapsules may be further surface treated in suspension or in isolated (dry) form by adding tri-, di- or mono-alkoxysilane. Surface treatment of the microcapsules can modify the adaptability, pH resistance, and mechanical strength of the microcapsules.

Preferably, the microcapsules are in the form of an aqueous suspension. The concentration of microcapsules in the aqueous suspension is not particularly limited, but can be, for example, 10 to 50 weight %, 20 to 40 weight %, or 25 to 35 weight %.

With the present invention, microcapsules with a specific core-shell structure are not applied to the surface of the cured product of the cement composition, but rather are blended into the cement composition.

The microcapsules can react with cement and other components of the composition of the present invention, such as alkali and silica, to form a mesh structure containing siloxane bonds on the surface of the cement particles and the cured product of the composition of the present invention. In the aforementioned mesh structure, hydrophobic groups such as alkyl groups or the like are aligned facing outward to form a water repellent layer, which covers the surface of the cement particles and the cured product of the composition of the present invention, as well as the surface of pores or voids dispersed inside the cured product, thereby providing the cured product with high resistance to penetration of substances, especially high water resistance, both on the surface and inside.

In general, conventional silane-based water absorption inhibitors are applied to the surface of a cured product of concrete or other cement composition to form a water repellent layer of hydrophobic inorganic crystals on the surface, and to a limited extent, up to about 1 cm inside the concrete. However, the microcapsules used in the present invention form a water repellent layer both on the surface of the cured composite and deep into the interior beyond 1 cm from the surface, and therefore, if cracks extend more than 1 cm from the surface of the concrete into the interior, for example, the water repellent layer can still be formed, and water and harmful substances can be prevented from penetrating into the concrete, and thus rusting and corrosion of the internal steel bars, which can lead to deterioration of the load-bearing capacity of the concrete, can be prevented.

Furthermore, the water repellent layer prevents the penetration of water and the like from the outside without filling or blocking the pores or voids on the surface and inside of the cured product of the composition of the present invention, and this dissipates unwanted water that exists inside the cured product and that is not used for the hydration reaction of the binding material such as cement particles, as water vapor to the outside of the cured product. This also has the effect of inhibiting the progression of alkali-silica reactions and other degradations that occur when moisture remains inside the cured product.

The composition of the present invention contains microcapsules at a ratio of 0.01 to less than 0.5 parts by weight per 100 parts by weight of cement. The amount of microcapsules is preferably 0.02 to 0.4 parts by weight per 100 parts by weight of cement, more preferably 0.03 to 0.35 parts by weight, more preferably 0.04 to 0.3 parts by weight, more preferably 0.05 to 0.25 parts by weight, and even more preferably 0.06 to 0.21 parts by weight. This allows the air content stability of the composition of the present invention and the cured product thereof as well as all of substance penetration prevention, drying shrinkage, and freeze-thaw resistance of the cured product of the composition of the present invention to all be excellent.

If the amount of microcapsules used in the composition of the present invention is less than 0.01 part by mass per 100 parts by weight of cement, the amount used is too small for the air content stability of the composition of the present invention and cured product thereof, as well as all of the substance penetration prevention, drying shrinkage, and freeze-thaw resistance of the cured product of the composition of the present invention to be excellent. If the amount of microcapsules used in the composition of the present invention is 0.5 parts by mass or more per 100 parts by weight of cement, the strength or freeze-thaw resistance of the cured product thereof is reduced or the like, making it difficult for the air content stability of the composition of the present invention and cured product thereof, as well as all of the substance penetration prevention, drying shrinkage, and freeze-thaw resistance of the cured product of the composition of the present invention to be excellent, and making economic efficiency inferior.

Cement

The composition of the present invention contains cement.

The cement added to the composition of the present invention is not particularly limited, and examples include normal Portland cement, fast strong Portland cement, super fast strong Portland cement, Sulfate resistant Portland cement, moderate heat Portland cement, low heat Portland cement, white Portland cement, ultra fast curing Portland cement, expansion cement, acid phosphate cement, self-curing cement, lime slag cement, blast furnace cement, high sulfate slag cement, fly ash cement, keens cement, pozzolanic cement, alumina cement, roma cement, white cement, magnesia cement, water tailings cement, calcium aluminate, silica cement, silica fume cement, jet cement, eco-cement, gypsum or semi-hydrated gypsum, blast furnace slag, and other potential hydraulic substances. These cements can be used singly or in a mixture of one or more types.

The amount of cement in the composition of the present invention is not limited, but can be, for example, from 1 to 50 weight %, 5 to 40 weight %, 10 to 30 weight %, or 15 to 20 weight %, based on the total weight of the composition.

Aggregate

The composition of the present invention can further contain at least one aggregate.

Aggregates that can be incorporated into the composition of the present invention are not limited, and for example, coarse aggregates, fine aggregates, or mixtures thereof commonly used in the field of civil engineering or construction can be used.

Examples of coarse aggregate include river gravel, pit sand, sea gravel, crushed stone, blast furnace slag coarse aggregate, and the like.

Examples of fine aggregate include river sand, pit sand, sea sand, blast furnace slag fine aggregate, and the like.

The amount of aggregate in the composition of the present invention is not particularly limited, but may be, for example, 10 to 1,000 parts by weight, 50 to 800 parts by weight, or 100 to 500 parts by weight per 100 parts by weight of cement.

The compositions of the composition of the present invention can be in the form of mortar or concrete, for example.

Other Components

The composition of the present invention may contain other components that are commonly used in the field of civil engineering or construction. Examples of other components can include AE agents, water reducers (preferably AE water reducers, especially high-performance AE water reducers), waterproofing agents, water resistance agents, defoaming agents, curing agents, mold release agents, shrinkage reducers, surface aesthetic enhancers, coagulation promoters, coagulation retarders, self-leveling agents, paints, surface repair materials, thickeners, expansion agents, rust inhibitors, inorganic fibers, organic fibers, organic polymers, silica fume, fly ash, blast furnace slag fine powder, and the like.

Other components may include water. The water is not limited, and examples can include tap water, industrial water, ground water, river water, rain water, distilled water, and highly pure water for chemical analysis (ultrapure water, pure water, ion-exchanged water), and the like. Note that the water preferably does not contain impurities such as chloride ions, sodium ions, potassium ions, and the like, which adversely affect the hydration reaction of the cement composition.

The amount of water in the composition of the present invention is not particularly limited, but may be, for example, 25 to 75 parts by weight, 30 to 70 parts by weight, 35 to 65 parts by weight, or 40 to 60 parts by weight per 100 parts by weight of cement.

Air Content Stability

The composition of the present invention has excellent air content stability.

In the composition of the present invention, the air content, as measured in a test based on JIS A 1128 (Test method for air content of fresh concrete by pressure—air chamber pressure method), is preferably 3 to 6 volume %. The air content specified by the Japan Society of Civil Engineers and the Architectural Institute of Japan is 4.5±1.5 volume %, and the composition of the present invention can meet this specification.

Furthermore, the composition of the present invention does not easily defoam air from the composition when kneaded. Therefore, the composition of the present invention can contain a specified amount of air in a stable manner before and after mixing. Normally, the composition of the present invention is cured during a kneading operation, so that the composition of the present invention and the cured product thereof can contain approximately the same amount of air in a stable manner.

[Cured Product]

A second aspect of the present invention is a cured product of the composition of the present invention (hereinafter, simply referred to as "the cured product of the present invention"). Herein, "curing" means that the composition of the present invention reacts with water to cause the composition to set or solidify, and "cured product" refers to an object after curing has been completed.

Air Content Stability

The air content of the cured product of the present invention is preferably 3 to 6 volume %. The air content specified by the Japan Society of Civil Engineers and the Architectural Institute of Japan is 4.5±1.5 volume %, and the cured product of the present invention can meet this specification.

The cured product of the present invention can maintain stable air content.

The cured product of the present invention has fine bubbles (pores or voids) due to the air that is contained inside. Furthermore, the microcapsules form a water repellent layer on the surface without destroying the aforementioned bubbles (pores or voids). Thus, when moisture is contained in the cured product of the present invention, the necessary amount of fine pores or voids (an amount of air which is preferably 3 to 6 volume %) required to absorb the expansion pressure generated when the moisture freezes and expands in volume is maintained. As a result, the cured product of the present invention can exhibit excellent freeze-thaw resistance, for example, as described below.

Strength

The cured product of the present invention can exhibit excellent strength. For example, the cured product of the present invention can have excellent compressive and/or tensile strength. Therefore, the cured product of the present invention has high durability and load resistance.

For example, the cured product of the present invention can have a compressive strength ratio after 28 days of curing in standard water of 100% or higher during a compression test based on JIS A 1108 (Compressive strength test method for concrete) and JIS A 6204 (Chemical admixture for concrete).

The compressive strength ratio can be calculated by the following equation which determines the compressive strength of concrete as defined in JIS A 6204 (Chemical admixtures for concrete):

Compressive strength ratio=Compressive strength of the cured product of the composition of the present invention containing microcapsules, measured in accordance with JIS A 1108 (Compressive strength test method for concrete) ÷Compressive strength of the cured product of the cement composition without microcapsules, measured in accordance with JIS A 1108 (Compressive strength test method for concrete).

Substance Penetration Prevention

The cured product of the present invention can prevent or inhibit the penetration of various substances into the cured product. The substances include, for example, water, chloride ions, and the like.

For example, the following formulae are used to obtain the inhibition ratio for deterioration factors specified in the Manual (Draft) on Design and Construction Guidelines for Surface Protection Methods by Construction Type, which is specified by the Japan Society of Civil Engineers:

Ratio of each performance to the original test specimen (%)=(Performance of the test specimen/ Performance of the original specimen)×100

Inhibition ratio for each deterioration factor (%)=100−Ratio of each performance to the original test specimen (%).

Note that deterioration factors include, for example, water and chloride ions, and performance refers to water permeability, water absorption, moisture permeability, neutralization depth, chloride ion penetration depth, and the like.

For example, the cured product of the present invention has a water permeability inhibiting ratio after aging for 28 days in standard water of 60% or higher, preferably 70% or higher, and more preferably 80% or higher, when tested by the water permeability test based on JIS A 6909 (Finishing coatings for construction (permeability test)) and JSCE-K571 (Test Method for Surface Impregnation Materials (Draft)), and the water permeability control rate is 70% or higher at distances of 10 mm or higher, preferably 30 mm or higher, and more preferably 50 mm or higher, inward from the surface.

The low permeability of the cured product of the present invention prevents deterioration of the physical properties of the cured product due to water penetration.

Drying Shrinkage

In a length change test based on JIS A 1129-3 (Method of measuring length change of mortar and concrete—Part 3) and JIS A 6 204 (Chemical admixture for concrete), the drying shrinkage rate of the cured product of the present invention for 6 months after curing in standard water for 7 days can be $1{,}000\times10^{-6}$ or less, and preferably $900\times10^{-6}$ or less.

In other words, the cured product of the present invention has low drying shrinkage and excellent dimensional stability.

Freeze-Thaw Resistance

In a freeze-thaw test based on JIS A 1148 (Freeze-thaw test of concrete (method A)) and JIS A 6204 (Chemical admixture for concrete), the relative dynamic modulus of elasticity (durability index) or mass loss ratio of the cured product of the present invention after 300 freeze-thaw cycles after curing in standard water for 4 weeks can be 80% or higher and 2.0% or less, respectively.

As previously mentioned, the cured product of the present invention has fine internal air bubbles (voids), and the microcapsules form a water repellent layer on the surface without destroying the air bubbles (voids), and therefore, if the cured product of the present invention contains moisture, the necessary amount of fine pores or voids (the amount of air is preferably 3 to 6 volume %) required to absorb the expansion pressure generated when the water freezes and expands in volume is maintained. Therefore, the cured product of the present invention can exhibit excellent freeze-thaw resistance. In other words, the cured product of the present invention has high resistance to brittleness caused by repeated freezing and thawing.

Furthermore, in general, repeated freezing and thawing can cause the surface of the cured product of the cement composition to flake off, thereby exposing the steel material and causing corrosion in the case of reinforced concrete, for example, but the low mass loss ratio of the cured product of the present invention inhibits these problems.

The void spacing coefficient of the cured product of the present invention calculated based on ASTM C 457 (Linear traverse method or modified point count method using a microscope) can be 300 μm or less.

The cured product of the present invention has fine bubbles (pores) inside, and the distribution of the bubbles (pores) is uniform. Thus, the cured product of the present invention can exhibit uniform physical properties such as substance penetration prevention, drying shrinkage, and freeze-thaw resistance.

[Molded Body]

A third aspect of the present invention is a molded body containing the cured product of the present invention. Herein, "molded body" refers to an object having a three-dimensional shape, and the shape is not limited.

The description of the cured product for the second aspect of the present invention applies to the cured product and the components or constituents thereof.

The molded body containing the cured product of the present invention can be manufactured by on-site concreting. "On-site concreting" means to assemble wooden or steel formwork at a civil engineering/construction site or the like, incorporate reinforcing bars as necessary, and cast a cement (concrete) composition into the formwork to solidify, thereby completing the cured product of the cement (concrete) composition at the civil engineering/construction site or the like.

The molded body containing the cured product of the present invention can be used as a component to form concrete structures, such as civil engineering structures, construction structures (buildings, condominiums, and the like), waterway structures (concrete pipes, culverts, and the like), river structures (revetment blocks), coastal structures (wave dissipating blocks, breakwaters, seawalls, and the like), marine structures (offshore oil wells and the like), road structures (roads, tunnels, bridges, piers, and the like), retaining wall structures (block retaining walls, gravity retaining walls, L retaining walls, and the like), agricultural structures, landscape structures, and the like, but is not limited thereto. Concrete structures include not only so-called reinforced concrete structures, but also steel-concrete composite structures such as steel framed concrete structures, steel framed reinforced concrete structures, and concrete filled steel pipe structures.

The molded body containing the cured product of the present invention has excellent air content stability, substance penetration prevention, drying shrinkage, and freeze-thaw resistance, and therefore can be widely used without being affected by environmental conditions or construction conditions. Therefore, the molded body containing the cured product of the present invention is effective for construction of buildings and the like where both freeze and salt resistance are required, and for highways in snowy and cold mountainous areas where anti-freeze or snow-melting agents containing chlorides are applied in winter, where freeze, salt and fatigue degradation can occur in combination. Furthermore, the molded body containing the cured product of the present invention can also be used as at least a portion of coastal structures, marine structures, waterway structures, road structures, and retaining wall structures in cold regions, where resistance to frost, salt, and fatigue is required. Therefore, for example, when the present invention is applied to structures in environments that may be subject to combined frost and salt damage, such as coastal/marine structures or road structures such as expressway roads or the like in snowy and cold regions, excellent resistance to frost and salt damage is demonstrated, thereby extending the service life of the structure compared to structures composed of ordinary mortar or concrete.

[Civil Engineering or Construction Structure]

A fourth aspect of the present invention is a civil engineering or construction structure containing the cured product of the present invention.

The description of the cured product for the second aspect of the present invention applies to the cured product and the components or constituents thereof.

The civil engineering or construction structure containing the cured product of the present invention can be manufactured by on-site concreting.

The civil engineering or construction structures containing the cured product of the present invention are assumed to be concrete structures, such as civil engineering structures, construction structures (buildings, condominiums, and the like), waterway structures (concrete pipes, culverts, and the like), river structures (revetment blocks), coastal structures (wave dissipating blocks, breakwaters, seawalls, and the like), marine structures (offshore oil wells and the like), road structures (roads, tunnels, bridges, piers, and the like), retaining wall structures (block retaining walls, gravity retaining walls, L retaining walls, and the like), agricultural structures, landscape structures, and the like, but are not limited thereto.

The civil engineering or construction structure containing the cured product of the present invention has excellent air content stability, substance penetration prevention, drying shrinkage, and freeze-thaw resistance, and therefore can be widely used without being affected by environmental conditions or construction conditions. Therefore, the civil engineering or construction structure containing the cured product of the present invention is effective for construction of buildings and the like where both freeze and salt resistance are required, and for highways in snowy and cold mountainous areas where anti-freeze or snow-melting agents containing chlorides are applied in winter, where freeze, salt and fatigue degradation can occur in combination. Furthermore, the civil engineering or construction structure containing the cured product of the present invention can also be used as at least a portion of coastal structures, marine structures, waterway structures, road structures, and retaining wall structures in cold regions, where resistance to frost, salt, and fatigue is required. Therefore, for example, when the present invention is applied to structures in environments that may be subject to combined frost and salt damage, such as coastal/marine structures or road structures such as expressway roads or the like in snowy and cold regions, excellent resistance to frost and salt damage is demonstrated, thereby extending the service life of the structure compared to structures composed of ordinary mortar or concrete.

[Method of Manufacturing Cured Product]

A fifth aspect of the present invention is a method of manufacturing a cured product.

The method of manufacturing a cured product of the present invention includes:

a preparing step of adding a microcapsule provided with a core-shell structure having a core containing a water-repellent organosilicon material selected from a group consisting of organosilanes, organosilane partial condensation products, and branched siloxane resins, and a shell of a silicon-based network polymer containing a silica unit to a composition at least containing cement to prepare an uncured cement composition; and a curing step of curing the uncured cement composition. In the preparing step, the microcapsule is added within a range of 0.01 to less than 0.5 parts by weight per 100 parts by weight of the cement.

The description of the microcapsules and cement for the first aspect of the present invention applies to the microcapsules and components or constituents thereof and the cement.

The form of adding the microcapsules in the preparing step above is not particularly limited. For example, the microcapsules themselves may be added to the cement composition, or the microcapsules may be added to the cement composition in the form of an aqueous suspension.

The uncured cement composition may contain water. Therefore, for example, the microcapsules may be added after water is added to the cement composition in the preparing step above. Appropriate mixing after each addition is preferred. Furthermore, in the preparing step above, water and microcapsules may also be added to the cement composition together and mixed. Furthermore, water may be added after the microcapsules are added to the cement composition in the preparing step above. Appropriate mixing after each addition is preferred. Note that when microcapsules are added in the form of an aqueous suspension, the water is different from the water serving as a medium of the aqueous suspension.

The amount of water is not particularly limited, but may be, for example, 25 to 75 parts by weight, 30 to 70 parts by weight, 35 to 65 parts by weight, or 40 to 60 parts by weight per 100 parts by weight of cement. In particular, in order for the cured product of the cement composition to exhibit a compressive strength of 20 to 55 $N/mm^2$, the amount of water is preferably 35 to 65 parts by weight, and more preferably 40 to 60 parts by weight to 100 parts by weight of cement.

The curing step is a step of curing the uncured cement composition and can be performed by a general method in the technical field. The curing step can be performed, for example, by allowing the curing reaction of cement and water to proceed in air or water. Herein, if the uncured cement composition does not contain water, water is added to the composition in the curing step.

The curing step may be performed by casting the uncured cement composition into a prescribed space for compaction and then curing for a prescribed period of time.

The amount of microcapsules is preferably 0.02 to 0.4 parts by weight per 100 parts by weight of cement, more preferably 0.03 to 0.35 parts by weight, more preferably 0.04 to 0.3 parts by weight, more preferably 0.05 to 0.25 parts by weight, and even more preferably 0.06 to 0.21 parts by weight.

A cured product obtained by the manufacturing method of the present invention excels in all of air content stability, substance penetration prevention, drying shrinkage, and freeze-thaw resistance.

For example, the air content of the cured product obtained by the manufacturing method can be within a range of 3 to 6 volume %.

Furthermore, a cured product obtained by the manufacturing method of the present invention can have a compressive strength ratio after 28 days of curing in standard water of 100% or higher during a compression test based on JIS A 1108 (Compressive strength test method for concrete) and JIS A 6204 (Chemical admixture for concrete).

Furthermore, a cured product obtained by the manufacturing method of the present invention has a water permeability inhibiting ratio after aging for 28 days in standard water of 60% or higher, preferably 70% or higher, and more preferably 80% or higher, when tested by the water permeability test based on JIS A 6909 (Finishing coatings for construction (permeability test)) and JSCE-K571 (Test Method for Surface Impregnation Materials (Draft)), and the water permeability control rate is 70% or higher at distances of 10 mm or higher, preferably 30 mm or higher, and more preferably 50 mm or higher, inward from the surface.

Furthermore, in a length change test based on JIS A 1129-3 (Method of measuring length change of mortar and concrete—Part 3) and JIS A6 204 (Chemical admixture for concrete), the drying shrinkage rate of a cured product obtained by the manufacturing method of the present invention for 6 months after curing in standard water for 7 days can be $1{,}000\times10^{-6}$ or less, and is preferably $900\times10^{-6}$ or less.

Furthermore, in a freeze-thaw test based on JIS A 1148 (Freeze-thaw test of concrete (method A)) and JIS A 6204 (Chemical admixture for concrete), the relative dynamic modulus of elasticity (durability index) or mass loss ratio of a cured product obtained by the manufacturing method of the present invention after 300 freeze-thaw cycles after curing in standard water for 4 weeks can be 80% or higher and 2.0% or less, respectively.

Furthermore, the void spacing coefficient of a cured product obtained by the manufacturing method of the present invention calculated based on ASTM C 457 (Linear traverse method or modified point count method using a microscope) can be 300 μm or less.

[Method of Improving Physical Properties of Cured Product]

A sixth aspect of the present invention is a method of improving the substance penetration prevention, drying shrinkage, freeze-thaw resistance, and air content stability of a cured product of a composition containing cement.

The improving method of the present invention is a step of adding a microcapsule provided with a core-shell structure having:

a core containing a water-repellent organosilicon material selected from a group consisting of organosilanes, organosilane partial condensation products, and branched siloxane resins; and a shell of a silicon-based network polymer containing a silica unit to a composition at least containing cement, within a range of 0.01 to less than 0.5 parts by weight per 100 parts by weight of the cement.

The description of the microcapsules and cement for the first aspect of the present invention applies to the microcapsules and components or constituents thereof and the cement.

The amount of microcapsules is preferably 0.02 to 0.4 parts by weight per 100 parts by weight of cement, more preferably 0.03 to 0.35 parts by weight, more preferably 0.04 to 0.3 parts by weight, more preferably 0.05 to 0.25 parts by weight, and even more preferably 0.06 to 0.21 parts by weight.

The improving method of the present invention can make the air content stability, substance penetration prevention, drying shrinkage, and freeze-thaw resistance of a cured product all excellent.

In other words, when comparing a cured product of a cement composition not applying the method of the present invention with a cured product of a cement composition applying the method of the present invention, the properties of the latter are improved as compared to the former in all of the following: air content stability, substance penetration prevention, drying shrinkage, and freeze-thaw resistance.

For example, the improving method of the present invention can make the air content of a cured product be within a range of 3 to 6 volume %.

Furthermore, the improving method of the present invention can achieve a cured product having a compressive strength ratio after 28 days of curing in standard water that is 100% or higher during a compression test based on JIS A 1108 (Compressive strength test method for concrete) and JIS A6204 (Chemical admixture for concrete).

Furthermore, the improving method of the present invention can improve the prevention of various substances from penetrating the cured product. The substances include, for example, water, chloride ions, and the like.

For example, the improving method of the present invention can achieve a cured product having a water permeability inhibiting ratio after aging for 28 days in standard water of 60% or higher, preferably 70% or higher, and more preferably 80% or higher, when tested by the water permeability test based on JIS A 6909 (Finishing coatings for construction (permeability test)) and JSCE-K571 (Test Method for Surface Impregnation Materials (Draft)), and the water permeability control rate is 70% or higher at distances of 10 mm or higher, preferably 30 mm or higher, and more preferably 50 mm or higher, inward from the surface.

Furthermore, the improving method of the present invention can achieve a cured product with a drying shrinkage rate for 6 months after curing in standard water for 7 days that is $1{,}000\times10^{-6}$ or less, and preferably $900\times10^{-6}$ or less, in a length change test based on JIS A1129-3 (Method of measuring length change of mortar and concrete—Part 3) and JIS A6 204 (Chemical admixture for concrete).

Furthermore, the improving method of the present invention can achieve a cured product having a relative dynamic modulus of elasticity (durability index) or mass loss ratio after 300 freeze-thaw cycles after curing in standard water for 4 weeks that is 80% or higher and 2.0% or less, respectively, in a freeze-thaw test based on JIS A 1148 (Freeze-thaw test of concrete (method A)) and JIS A 6204 (Chemical admixture for concrete).

Furthermore, the improving method of the present invention can achieve a cured product having a void spacing coefficient calculated based on ASTM C 457 (Linear traverse method or modified point count method using a microscope) that is 300 μm or less.

[Admixture]

A final aspect of the present invention is an admixture. The admixture of the present invention is used by being added and blended into a cement composition containing at least cement.

The admixture of the present invention is an admixture for a cement composition, which can be used for improving all of air content stability, substance penetration prevention, drying shrinkage, and freeze-thaw resistance of a cured product of the composition, containing:

- a microcapsule provided with a core-shell structure having
- a core containing a water-repellent organosilicon material selected from a group consisting of organosilanes, organosilane partial condensation products, and branched siloxane resins, and
- a shell of a silicon-based network polymer containing a silica unit.

Herein, “improve”, when comparing a cured product of a cement composition in which the admixture of the present invention is not blended with a cured product of a cement composition in which the admixture of the present invention is blended, means that the properties of the latter are improved as compared to the former in all of the following: air content stability, substance penetration prevention, drying shrinkage, and freeze-thaw resistance.

The description of the microcapsules and cement for the first aspect of the present invention applies to the microcapsules and components or constituents thereof and the cement.

The admixture of the present invention is preferably in the form of a suspension in which the microcapsules are suspended in an aqueous medium, more preferably in the form of an emulsion, and even more preferably in the form of an emulsion containing a surfactant. Water is described as the aqueous medium above, but if necessary, a hydrophilic medium such as an alcohol or the like that has affinity with water may be blended with the water.

It is widely known that alkyl alkoxysilanes and condensates thereof are useful as water absorption inhibitors for concrete and other civil engineering and construction materials. Furthermore, in general, these alkyl alkoxysilanes are diluted with various solvents as penetrating water absorption inhibitors. When these so-called solvent-type water absorption inhibitors are applied to civil engineering and construction materials, high water repellency is exhibited, but use thereof is limited by the volatility, flammability, and the like of the solvents. Furthermore, in general, the solvent-type cannot be used on a wet concrete surface due to being hydrophobic, and also has problems, such as inhibiting the hydration reaction of cement and water and the resulting strength development in cement compositions containing water or cured concrete products, and the like. On the other hand, the admixture of the present invention in the form of an aqueous suspension is aqueous, and therefore is preferable because there is no concern about environmental contamination or deterioration of the work environment, and problems do not occur, such as interfering with the hydration reaction of cement and water and the resulting strength development in the cement compositions containing water or cured concrete products, and the like.

The concentration of microcapsules in the admixture of the present invention is not particularly limited, but can be, for example, 10 to 50 weight %, 20 to 40 weight %, or 25 to 35 weight %, based on the total weight of the admixture.

EXAMPLES

Hereinafter, the present invention will be described in more detail based on Examples, but the present invention is not limited to these Examples.

[Materials Used]

Portland cement: JIS R 5210 conforming product. Density: 3.16 g/cm$^3$.

Coarse aggregate: Crushed stone from Sakuragawa, Ibaraki Prefecture. JIS A 5005 crushed stone 2005 conforming product. Density: 2.65 g/cm$^3$. Water absorption=0.69 w/w %.

Fine aggregate: Pit sand from Kakegawa, Shizuoka Prefecture. Conforms to gravel and sand in Annex A of JIS A 5308. Density: 2.57 g/cm$^3$. Water absorption=2.11 w/w %.

AE water reducer: Flowric SV10 (manufactured by FLOWRIC CO., LTD.). JIS A 6204 conforming product.

Silicon-based multifunctional admixture: DOWSIL IE 6686 manufactured by Dow Toray Co., Ltd., Active solid component: 30 weight %

Example 1

In accordance with JIS A 1138 (Method of creating concrete in a laboratory), 183 kg of mixing water (W), 991 kg of a coarse aggregate (G), 725 kg of a fine aggregate (S), and 2.93 kg of an AE water reducer were added per 366 kg of Portland cement (C) and then kneaded with a forced twin-shaft mixer to obtain a base composition.

A silicon-based multifunctional admixture was added to the obtained base composition at a ratio of 0.2 parts by weight to 100 parts by weight of ordinary Portland cement (C), which was then kneaded to obtain a cement (concrete) composition. For the silicon-based multifunctional admixture, product name DOWSIL IE 6686 was used as a silicone emulsion product having a core-shell structure (commercially available product). DOWSIL IE 6686 has 30 weight % of an active solid component, and therefore, microcapsules having a core-shell structure are included at 0.06 parts by weight to 100 parts by weight of the cement (C).

Example 2

A cement (concrete) composition was obtained in the same manner as Example 1, except that a silicon-based multifunctional admixture (X) was added at a ratio of 0.5 parts by weight to 100 parts by weight of ordinary Portland cement (C) and then kneaded. Microcapsules having a core-shell structure are included at 0.15 parts by weight to 100 parts by weight of the cement (C).

Example 3

A cement (concrete) composition was obtained in the same manner as Example 1, except that a silicon-based multifunctional admixture (X) was added at a ratio of 0.7 parts by weight to 100 parts by weight of ordinary Portland cement (C) and then kneaded. Microcapsules having a core-shell structure are included at 0.21 parts by weight to 100 parts by weight of the cement (C).

Comparative Example 1

The base composition used in Example 1 was used as is.

Comparative Example 2

A cement (concrete) composition was obtained in the same manner as in Example 2, except that an admixture (Y) containing a silane compound was used instead of the silicon-based multifunctional admixture (X). The admixture (Y) containing the silane compound has the same overall composition as the silicon-based multifunctional admixture (X), but differs in that it does not have a core-shell structure.

Table 1 shows the unit amounts of material used in the preparation of each cement (concrete) composition in Examples 1 to 3 and Comparative Examples 1 and 2.

TABLE 1

Table 1

| | W/C | S/(S + G) | X/C | Y/C | Unit amount (kg/m$^3$) | | | | |
|---|---|---|---|---|---|---|---|---|---|
| | (%) | (%) | (%) | (%) | W | C | S | G | AD |
| Comparative Example 1 | 50 | 43 | 0.0 | — | 183 | 366 | 725 | 991 | 2.93 |
| Example 1 | 50 | 43 | 0.2 | — | 183 | 366 | 725 | 991 | 2.93 |
| Example 2 | 50 | 43 | 0.5 | — | 183 | 366 | 725 | 991 | 2.93 |
| Example 3 | 50 | 43 | 0.7 | — | 183 | 366 | 725 | 991 | 2.93 |
| Comparative Example 2 | 50 | 43 | — | 0.5 | 183 | 366 | 725 | 991 | 2.93 |

X: Multifunctional cement admixture of the present invention
Y: Admixture containing silane compound for comparison
AD: Flowric SV10 (AE water reducer)

[Evaluation]

1. Physical Properties of Cement (Concrete) Composition Before Curing

The cement (concrete) compositions of Examples 1 to 3 and Comparative Examples 1 to 2 before curing were measured for slump according to JIS A 1101 (Slump Test Method for Concrete), slump flow according to JIS A 1150 (Slump Flow Test Method for Concrete), setting time according to JIS A 1147 (Setting Time Test Method for Concrete), and the amount of air according to JIS A 1128 (Test Method For Air Content Of Fresh Concrete By Pressure—Air Chamber Pressure Method).

The results are shown in Table 2.

TABLE 2

| | Air ratio (%) | Slump (cm) | Slump flow (mm) | Setting time: Initial setting time (hours/minutes) | Setting time: Final setting time (hours/minutes) |
|---|---|---|---|---|---|
| Comparative Example 1 | 3.5 | 20 | 340 | 5-35 | 7-15 |
| Example 1 | 4.5 | 19 | 305 | 5-50 | 7-35 |
| Example 2 | 4.8 | 19 | 315 | 5-15 | 6-45 |
| Example 3 | 4.3 | 18 | 290 | 5-35 | 7-25 |
| Comparative Example 2 | 3.9 | 20 | 310 | — | — |

2. Physical Properties of Cement (Concrete) Composition after Curing (1) Water Permeability Control Rate In accordance with JIS A 1132 (Method Of Making Specimens For Strength Test Of Concrete), cylindrical test specimens (cured in standard water for 28 days) made of the cured cement (concrete) compositions of Examples 1 to 3 and Comparative Examples 1 to 2 were fabricated and used as test specimens for JIS A 6909 (Finishing Coatings For Construction (Permeability Test (Method B)) and JSCE-K 571 (Test Method for Surface Impregnation Substances (Draft)).

The water permeability was first measured at an upper (circular) surface of the test specimen, and then the specimen was cut and ground down in 5 mm intervals in a height direction from the upper surface to measure the water permeability from the upper surface of the test specimen to a position 50 mm below. The water permeability ratio was determined by the following formula based on the calculation formula specified in JSCE-K 571 (Test Methods for Surface Impregnated Materials (Draft)), and the water permeability control rate was calculated by the following formula.

Water permeability ratio (%)=Permeability of test specimens in Examples 1 to 3 and Comparative Example 2/water permeability of the test specimen in Comparative Example 1×100

Water permeability control rate (%)=100−water permeability rate (%)

As the water permeability control rate approaches 100 (%), the less permeable the test specimen is compared to Comparative Example 1. The results are shown in Table 3 and FIG. 1.

(2) Compressive Strength Ratio

A compressive strength test was conducted using test specimens made of cured cement (concrete) compositions (cured in standard water for 28 days) from Examples 1 to 3 and Comparative Examples 1 and 2 in accordance with JIS A 1132 (Methods Of Making Specimens For Strength Tests Of Concrete), JIS A 1108 (Method for Testing Compressive Strength of Concrete), and JIS A 6204 (Chemical Admixtures for Concrete).

The compressive strength ratio was calculated from the measured compressive strength values using the following formula based on the calculation formula specified in JIS A 6204.

Compressive strength ratio=Compressive strength of cured product of the compositions of Examples 1 to 3 and Comparative Example 2 measured according with JIS A 1108 (Compressive Strength Test Method For Concrete)÷Compressive strength of cured product of Comparative Example 1 measured in accordance with JIS A 1108 (Compressive Strength Test Method for Concrete)

The results are shown in table 3.

(3) Drying Shrinkage Strain

The length change ratio (6 months) was measured using test specimens made of cured cement (concrete) compositions (cured in standard water for 7 days) from Examples 1 to 3 and Comparative Examples 1 and 2 in accordance with JIS A 1129-3 (Method of measuring length change of mortar and concrete—Part 3) and JIS A 6204 (Chemical Admixtures for Concrete). The length change rate is also referred to as the drying shrinkage rate.

The results are shown in table 3.

(4) Durability Index

Test specimens (cured in standard water for 4 weeks) were fabricated by curing cement (concrete) compositions according to Examples 1 to 3 and Comparative Examples 1 and 2 in accordance to JIS A 1148 (Freezing and thawing test of concrete (A method)) and JIS A 6204 (Chemical admixture for concrete), and freeze-thaw tests in water were performed using these specimens, and the primary resonance frequency of deflection vibration and mass of the test specimens were measured.

The relative dynamic modulus of elasticity and the mass loss ratio after 300 freeze-thaw cycles were calculated from these measured values using the formulas specified in JIS A 1148 (Freeze-thaw test of concrete (Method (A)).

Figure 2:
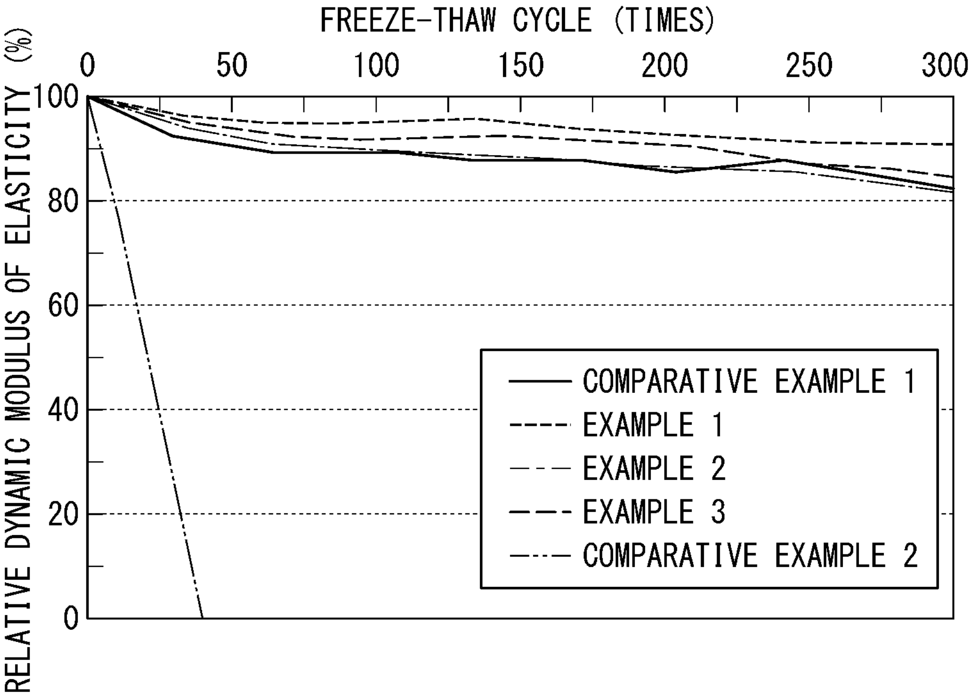
FIG. 2 shows the relationship between freeze-thaw cycles and the relative dynamic modulus of elasticity.
Figure 3:
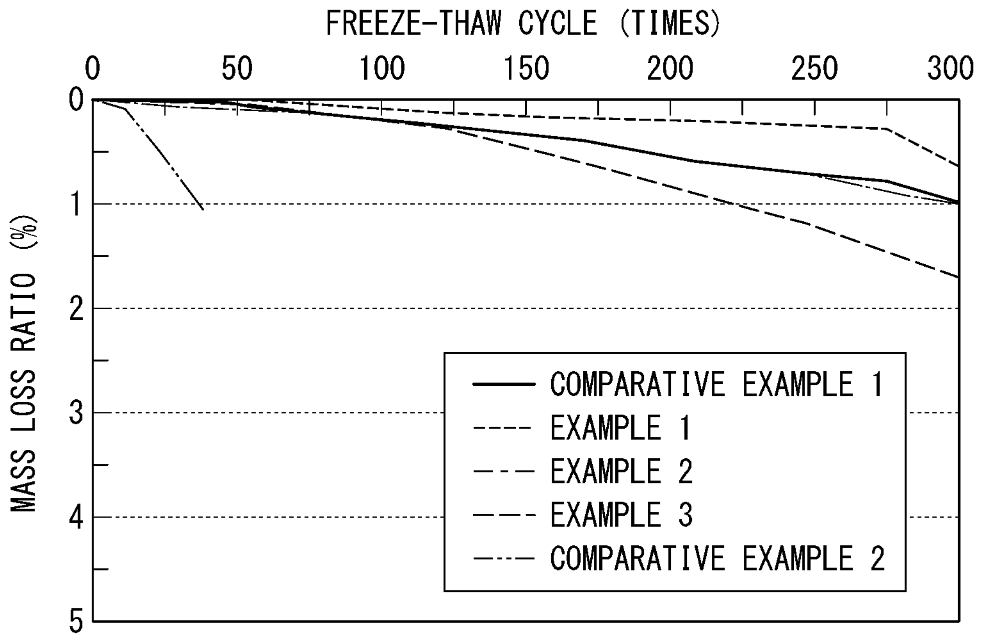
FIG. 3 shows the relationship between freeze-thaw cycles and the mass loss ratio.

The results are shown in Tables 3 and 4 as well as FIG. 2 and FIG. 3.

(5) Void Spacing Coefficient

Test specimens were prepared by curing the cement (concrete) compositions of Examples 1 to 3 and Comparative Examples 1 and 2, and the void spacing coefficient was calculated by the linear traverse method using these test specimens, in accordance with ASTM C 457 (Linear Traverse Method Or Modified Point Count Method By Microscope).

The results are shown in table 3.

TABLE 3

Table 3

| | Water permeability control rate (%) | | Compressive strength | Length change rate | Relative dynamic modulus of | Void spacing |
|---|---|---|---|---|---|---|
| | Upper surface | 50 mm | ratio (%) | ($\times10^{-6}$) | elasticity (%) | coefficient (μm) |
| Comparative Example 1 | — | — | — | 739 | 83 | 246 |
| Example 1 | 62 | 70 | 100 | 784 | 91 | 260 |
| Example 2 | 86 | 70 | 100 | 845 | 82 | 277 |
| Example 3 | 70 | 90 | 100 | 909 | 85 | 159 |
| Comparative Example 2 | 58 | 70 | 92 | 718 | 0 | Not measurable* |

*The relative dynamic modulus of elasticity, which is an index of freeze damage resistance, was 0 at 50 cycles or less (see FIG. 2). The requirement of 60% or more at a state of 300 cycles by the Japan Society of Civil Engineers and the Architectural Institute of Japan could not be met, and the surface of the test specimen had been severely disintegrated by the scale at 50 cycles or less, making it extremely brittle and unable to be used for weighing mass or measuring the void spacing coefficient. This very brittle condition is not satisfactory for use as a concrete molded product.

TABLE 4

| | Mass loss ratio (%) |
|---|---|
| Comparative Example 1 | 1.0 |
| Example 1 | 0.7 |
| Example 2 | 1.0 |
| Example 3 | 1.7 |
| Comparative Example 2 | Not measurable |

The air content in Examples 1 to 3 was within the range specified by the Japan Society of Civil Engineers and the Architectural Institute of Japan of 4.5±1.5%, and with regard to the setting time, there was no significant delay or acceleration in both the initial setting time and final setting time compared to Comparative Example 1. Thus, a strong water permeability control rate was achieved without substantially compromising freeze damage resistance expressed by a high compressive strength ratio, relative dynamic modulus of elasticity, and void spacing coefficient.

On the other hand, in Comparative Example 2, the air content was within the specified range above, and although the water permeability control rate was improved in Comparative Example 2, the compressive strength ratio decreased and the freeze damage resistance, as indicated by the relative dynamic modulus of elasticity, decreased significantly, resulting in failure to ensure practically acceptable strength and freeze damage resistance. These results are attributed to the inhibited hydration reaction of cement and water and the associated strength development in cement compositions and cured concrete product containing water.

The invention claimed is:

1. A cured product of a cement composition, the cement composition comprising:

a microcapsule provided with a core-shell structure having a core containing a water-repellent organosilicon material selected from the group consisting of organosilanes, organosilane partial condensation products, and branched siloxane resins, and a shell of a silicon-based network polymer containing a silica unit; and cement;

wherein the microcapsule is included at 0.01 to 0.35 parts by weight per 100 parts by weight of the cement, wherein the organosilane is an organosilane containing at least one silicon-bonded alkyl group having 1 to 30 carbon atoms, wherein the branched siloxane resin is a siloxane resin containing a siloxane unit of the formula $RSiO_{3/2}$ where R represents an alkyl group, wherein the cured product comprises air and wherein the amount of air included is 3 to 6 volume %, as measured in a test based on JIS A 1128, and wherein, in a compression test based on JIS A 1108 and JIS A 6204, the compressive strength ratio after curing in standard water for 28 days is 100% or higher.

2. The cured product according to claim 1, wherein the organosilane is present.

3. The cured product according to claim 1, wherein the branched siloxane resin is present.

4. The cured product according to claim 1, further comprising at least one type of aggregate.

5. The cured product according to claim 1, wherein, in a permeability test based on JIS A 6909 (permeability test method B) and JSCE-K571, the water permeability control rate at the surface is 60% or higher, and the water permeability control rate at 30 mm or more to the inside from the surface is 70% or higher, after curing in standard water for 28 days.

6. The cured product according to claim 1, wherein, in a length change test based on JIS A 1129-3 and JIS A 6204, the drying shrinkage rate for 6 months after curing in standard water for 7 days is $1{,}000\times10^{-6}$ or less.

7. The cured product according to claim 1, wherein, in a freeze-thaw test based on JIS A 1148 (method A) and JIS A 6204, the relative dynamic modulus of elasticity (durability index) or mass loss ratio after 300 freeze-thaw cycles after curing in standard water for 4 weeks is 80% or higher and 2.0% or less, respectively.

8. The cured product according to claim 1, wherein the void spacing coefficient calculated based on ASTM C 457 is 300 μm or less.

9. A molded body, comprising the cured product according to claim 1.

10. A civil engineering or construction structure, comprising the cured product according to claim 1.

11. A method of manufacturing the cured product according to claim 1, the method comprising:

a preparing step of adding the microcapsule to a composition at least containing cement to prepare an uncured cement composition; and a curing step of curing the uncured cement composition;

wherein in the preparing step, the microcapsule is added within a range of 0.01 to 0.35 parts by weight per 100 parts by weight of the cement.

12. A method of improving the air content stability, substance penetration prevention, drying shrinkage, and freeze-thaw resistance of a cured product of a composition, the method comprising:

a step of adding a microcapsule provided with a core-shell structure having a core containing a water-repellent organosilicon material selected from the group consisting of organosilanes, organosilane partial condensation products, and branched siloxane resins, and a shell of a silicon-based network polymer containing a silica unit to a composition at least containing cement, within a range of 0.01 to 0.35 parts by weight per 100 parts by weight of the cement;

wherein the organosilane is an organosilane containing at least one silicon-bonded alkyl group having 1 to 30 carbon atoms, wherein the branched siloxane resin is a siloxane resin containing a siloxane unit of the formula $RSiO_{3/2}$ where R represents an alkyl group, wherein the cured product comprises air and wherein the amount of air included is 3 to 6 volume %, as measured in a test based on JIS A 1128, and wherein, in a compression test based on JIS A 1108 and JIS A 6204, the compressive strength ratio after curing in standard water for 28 days is 100% or higher.

* * * * *